(12) United States Patent
Hichwa et al.

(10) Patent No.: US 6,507,833 B1
(45) Date of Patent: Jan. 14, 2003

(54) METHOD AND APPARATUS FOR DYNAMICALLY RENDERING COMPONENTS AT RUN TIME

(75) Inventors: Michael Hichwa, Washington, DC (US); Christopher Beck, Ashburn, VA (US); Leo Nishio, San Francisco, CA (US)

(73) Assignee: Oracle Corporation, Redwood Shores, CA (US)

( * ) Notice: Subject to any disclaimer, the term of this patent is extended or adjusted under 35 U.S.C. 154(b) by 0 days.

(21) Appl. No.: 09/395,075

(22) Filed: Sep. 13, 1999

(51) Int. Cl.[7] .............................................. G06F 17/30
(52) U.S. Cl. .................... 707/1; 707/2; 707/3; 707/10; 707/104.1
(58) Field of Search ................................ 707/506, 507, 707/513, 104.1, 1–3, 500, 10

(56) References Cited

U.S. PATENT DOCUMENTS

| | | | | |
|---|---|---|---|---|
| 5,864,871 A | * | 1/1999 | Kitain et al. | 707/104 |
| 6,085,198 A | * | 7/2000 | Skinner et al. | 707/103 |
| 6,243,711 B1 | * | 6/2001 | Wu et al. | 707/104 |

* cited by examiner

Primary Examiner—Kim Vu
Assistant Examiner—Cam-Y Truong
(74) Attorney, Agent, or Firm—Hickman Palermo Truong & Becker LLP; Bobby K. Truong; Christian A. Nicholes

(57) ABSTRACT

A mechanism is provided for dynamically rendering a component instance at run time. According to the invention, a rendering engine is provided for each type of component that can be rendered, and each engine is responsible for rendering all instances of that component type. When it comes time to render a component instance, the rendering engine associated with that instance is invoked. When invoked, the rendering engine receives a set of metadata associated with the component instance, which specifies the attribute values for that instance. Based upon the metadata, the rendering engine determines, at run time, a format for the instance, and renders the instance in accordance with the determined format. By rendering the instance at run time based purely upon metadata, the present invention makes it possible to store only the metadata associated with the instance. Unlike the prior art, it is not necessary to store a component as a large static entity. As a result, the present invention requires less storage. Rendering the component instance using metadata also simplifies the management and maintenance of the components. Rather than managing a large number of static entities, only the metadata associated with the components needs to be managed. In addition, the present invention significantly reduces code redundancy (since code is centralized to the rendering engine). Overall, dynamically rendering components in accordance with the present invention leads to greater system efficiency.

29 Claims, 9 Drawing Sheets

| Components | 412 | 414 | 416 | |
|---|---|---|---|---|
| Type_ID | | Type_Name | Type_Engine | ... |
| T1 | | Report | Report | |
| T2 | | Form | Form | |
| T3 | | Menu | Menu | |
| T4 | | Hierarchy | Hierarchy | |
| T5 | | Chart | Chart | |
| ⋮ | | ⋮ | ⋮ | |

Component_Definition 420

| Type_ID | Attribute_ID | Default_Value | ... |
|---|---|---|---|
| T1 | A1 | | |
| T1 | A2 | | |
| T1 | A3 | | |
| ⋮ | ⋮ | | |
| T2 | B1 | | |
| T2 | B2 | | |
| T2 | B3 | | |
| ⋮ | ⋮ | | |
| T3 | C1 | | |
| T3 | C2 | | |
| T3 | C3 | | |
| ⋮ | ⋮ | | |
| T4 | D1 | | |
| T4 | D2 | | |
| T4 | D3 | | |
| ⋮ | ⋮ | | |
| T5 | E1 | | |
| T5 | E2 | | |
| T5 | E3 | | |
| ⋮ | ⋮ | | |

Fig.4B

Component_Details                                            470

| Instance_ID | Instance_Name | Version_No | Attribute_ID | Attribute_Value | . . . |
|---|---|---|---|---|---|
| 123 | Report 123 | 1 | A1 | | |
| 123 | Report 123 | 1 | A2 | | |
| 123 | Report 123 | 1 | A3 | | |
| ⋮ | ⋮ | ⋮ | ⋮ | | |
| 200 | Form 200 | 2 | B1 | | |
| 200 | Form 200 | 2 | B2 | | |
| 200 | Form 200 | 2 | B3 | | |
| ⋮ | ⋮ | ⋮ | ⋮ | | |
| 211 | Menu 211 | 1 | C1 | | |
| 211 | Menu 211 | 1 | C2 | | |
| 211 | Menu 211 | 1 | C3 | | |
| ⋮ | ⋮ | ⋮ | ⋮ | | |
| 402 | Hierarchy 402 | 1 | D1 | | |
| 402 | Hierarchy 402 | 1 | D2 | | |
| 402 | Hierarchy 402 | 1 | D3 | | |
| ⋮ | ⋮ | ⋮ | ⋮ | | |
| 500 | Chart 500 | 1 | E1 | | |
| 500 | Chart 500 | 1 | E2 | | |
| 500 | Chart 500 | 1 | E3 | | |
| ⋮ | ⋮ | ⋮ | ⋮ | | |

Fig. 4D

METHOD AND APPARATUS FOR DYNAMICALLY RENDERING COMPONENTS AT RUN TIME

FIELD OF THE INVENTION

The present invention relates generally to computer systems and more particularly to a method and apparatus for dynamically rendering components at run time.

BACKGROUND OF THE INVENTION

For a number of years now, database management systems have been used to store and to manage data critical to a company's operation, such as sales data, employee data, and customer information. One type of database management system that has emerged as the most prevalent is the relational database management system (RDBMS). In an RDBMS, information is stored in structures known as tables. A table typically comprises a plurality of columns and rows, with each column representing an attribute of a record and each row representing a particular record. In a relational database, information is manipulated by way of queries. A query is a statement that specifies which attributes of which records are to be manipulated, and what operations are to be performed on them. A query is typically written using a structured query language, such as SQL, that is understood by the RDBMS. When a query is submitted, the RDBMS parses and executes the query to manipulate the data as specified. In a relational database, queries can be used to perform all data manipulations, including insert, retrieve, update, and delete.

Queries are powerful tools for manipulating data in a relational database. However, their usefulness may be limited by the amount of knowledge that they require on the part of the user. In order to construct a query, a user needs to be familiar with the structured query language used by the RDBMS. Such a language can be fairly complex and difficult to master. In addition, the user needs to know what information is stored in which tables. This in turn requires that the user be familiar with the schema of the database. In many implementations, end users of the database do not possess this level of sophistication. Hence, they cannot effectively interact with the database using queries.

To facilitate interaction between users and the database, applications such as forms and reports are typically developed. In a typical RDBMS, a form is used to insert, update, and delete information from the database. A report is usually used to retrieve mass amounts of information from the database and to present the information to the user in a particular format. Other applications have also been developed to present information to the user in other formats, including charts, menus, and hierarchies. One of the major underlying purposes of an application is to provide an interface for enabling a user to interact with the database without having to manually formulate queries. Queries are still used to interact with the RDBMS, but the burden of generating and manipulating the queries is on the application, not the end user. In essence, an application transfers the complexity of interacting with a database from the end user to the application developer.

Currently, applications are developed using one of two major methodologies. The first methodology involves writing actual computer code to define the functionality of the application. The application may be written in one of many different computer languages including C, C++, and Java. Using the chosen language, the developer defines the layout of the application and sets forth the logic for implementing the desired functionality. Once written, the application is stored as a static set of code, either in compiled form or as a source file. At run time, the application is executed just like any other program to enable a user to interact with the database. According to this methodology, each application is a separate and distinct executable entity. Thus, there needs to be a separate executable file for each and every form, report, etc.

A second methodology involves the use of an application development tool, such as Developer 2000 manufactured by Oracle Corporation of Redwood Shores, Calif. An application development tool typically comprises a design time engine and a run time engine. Using the design time engine, a developer defines the format of an application. The developer can also specify logic for controlling the functionality of the application. Once the defining process is completed, the design time engine generates an application, and stores it away as a static entity. One of the advantages of using a development tool is that it relieves the developer of having to write any actual computer code. Once the application is generated by the design time engine, it is ready for execution. At run time, the run time engine interprets the application, and renders the format and functionality defined by the developer. According to this methodology, each application is stored as a separate and distinct entity. Thus, as was the case with the first methodology, there needs to be a separate entity for each and every form, report, etc.

These two methodologies are generally effective for developing applications; however, they do have significant drawbacks which render them impracticable in certain implementations. One such drawback is that they require a relatively high level of sophistication from the application developer. With the first methodology, the developer needs to be a skilled programmer, having familiarity with both a programming language and the workings of a database. With the second methodology, while the developer is no longer required to write actual computer code, the developer still needs to learn to use the development tool. With a development tool such as Developer 2000 which has a deep and robust set of capabilities, the learning process can be quite involved. In many implementations, it would be desirable to have relatively unsophisticated users define and deploy applications. In such implementations, these two methodologies cannot be used.

Also, note that according to both methodologies, each application is stored as its own separate static entity. This means that for every form, report, or any other application used by a company, a separate static entity is stored and maintained. For large companies, the number of different applications can easily run into the thousands. With this large number of applications, the storage needed for all of the separate entities can be enormous. The process of maintaining and updating the entities can also be extremely tedious. In light of these shortcomings, an improved methodology for developing and deploying applications is needed.

SUMMARY OF THE INVENTION

To overcome the shortcomings of the prior art, the present invention provides an improved application development/deployment mechanism which enables relatively unsophisticated users to develop applications, and which does not require each application to be stored as its own large static entity. According to the present invention, there is provided a generic builder engine and a plurality of generic component rendering engines. As used herein, the term component refers to any application or any portion of an application for facilitating interaction between a user and a database, including but not limited to forms, reports, menus, charts, and hierarchies.

The general purpose of the builder engine is to make it simple for a user to define a particular component (i.e. to develop an application). The builder engine solicits from the developer, through a simple dialog, all of the information needed to define the component. In effect, the builder engine guides the developer through the defining process, thereby enabling a relatively unsophisticated developer to define a component. In one embodiment, the builder engine takes the form of a generic engine which solicits information from a developer based upon predefined metadata . More specifically, for each type of component that a developer can define, there is an associated set of predefined metadata. This metadata specifies what information needs to be solicited from the developer to define an instance of that type of component, and how that information should be solicited. Based upon this metadata, the generic builder engine dynamically generates one or more display pages to solicit the necessary information from the developer. In this manner, the builder engine guides the developer through the process of defining a component.

Implementing the builder engine in this generic manner is quite advantageous because it makes it possible for a single engine to be used to guide a developer through the defining process for all possible types of components. To add a new type of component, all that needs to be done is to add a set of predefined metadata describing the new component type. The builder engine will thereafter be able to guide a user through the defining process for that type of component. To change an existing component type, all that needs to be done is to change the predefined metadata associated with that type. The builder engine will thereafter reflect the change. No changes need to be made to the builder engine. Thus, the builder engine of the present invention is quite versatile and efficient.

Once the builder engine solicits and receives all of the necessary information from the developer to define a particular component, the information is stored as metadata associated with that particular component. This metadata differs from the predefined metadata used by the builder engine in that the predefined metadata pertains to a type of component (e.g. report, form, etc.) whereas this metadata pertains to a particular instance of a type of component (e.g. "report 101","form 203"). The metadata for a particular component specifies all of the necessary details to define the format of the component. The term format is used herein in a very broad sense to encompass the "look and feel" as well as the functionality of the component. Once the metadata for a particular component has been defined, the component is ready to be rendered (i.e. executed).

At run time, one of the generic rendering engines is invoked to dynamically generate the particular component. In one embodiment, a rendering engine is provided for each type of component (e.g. a chart rendering engine, a form rendering engine, etc.), and each engine is responsible for rendering all instances of that type. In generating a particular component, a rendering engine uses the metadata associated with that component. Each rendering engine is constructed in such a way that it understands the metadata associated with a component, and contains logic for implementing the functionality specified by the metadata. In effect, the rendering engines are responsible for implementing the format specified by the metadata.

An important point to note is that unlike the prior art methodologies, the present invention does not create a component (i.e. application) at design time and store it away as a static entity ready for execution. Rather, the present invention uses metadata at run time to dynamically generate a component. Thus, according to the present invention, a component is both generated and executed at run time. Rendering components in this manner is advantageous in at least two respects. First, it eliminates the need to store components as individual static entities. Because components are generated dynamically at run time using metadata, only the metadata needs to be stored. This serves to significantly reduce storage requirements. Second, the present invention significantly reduces code redundancy. In a system having a large number of applications, it is generally true that many of the applications contain identical code. Because the present invention uses the same generic rendering engine to render all components of a particular type, the code is centralized to the rendering engine. Due to this code centralization, there is practically no code redundancy. Overall, dynamically rendering components in accordance with the present invention leads to greater system efficiency.

BRIEF DESCRIPTION OF THE DRAWINGS

FIG. 3 is a block diagram of the logical components of the server of the present invention.

FIGS. 4a–4d show the various metadata tables maintained in the repository.

DETAILED DESCRIPTION OF THE EMBODIMENT(S)

Overview

Figure 1:
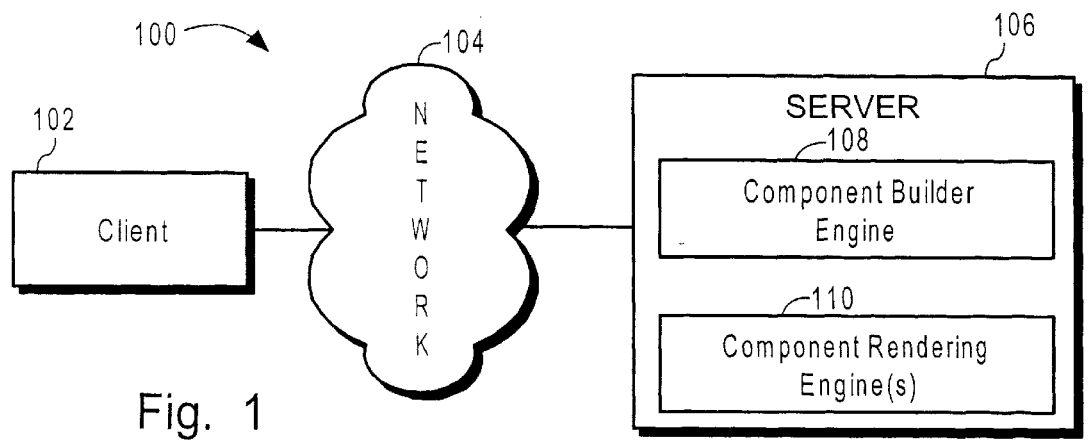
FIG. 1 is a block diagram of a general system in which the present invention may be implemented.

With reference to FIG. 1, there is shown a block diagram of a general system 100 in which the present invention may be implemented, the system 100 comprising a client 102 and a server 106. For the sake of simplicity, only one client 102 is shown; however, it should be noted that multiple clients 102 may be coupled to and serviced by the server 106. The client 102 is coupled to the server 106 via a network 104. Network 104 may be a local area network (LAN), such as an intranet within a particular company, or a wide area network (WAN), such as the World Wide Web. In system 100, it is the server 106 that is primarily responsible for implementing most if not all of the application logic. The client 102 is mainly responsible for communicating with the server 106, rendering the user interface (UI) and performing other simple functions. As a result, the client 102 may be a computer having limited processing and storage capabilities (i.e. may be a "thin" client). In performing its limited functions, the client 102 may run a program, such as a browser, which facilitates interaction with the server 106.

In accordance with the present invention, the server 106 comprises a component builder engine 108 and one or more component rendering engines 110. As used herein, the term "component" refers broadly to any application or any portion of an application which facilitates interaction between a user and a database, and may include, but is not limited to reports, forms, charts, menus, and hierarchies. The builder engine 108 is invoked to enable a user to define and, hence, to develop a specific instance of a type of component (e.g. a particular report). According to one embodiment, the builder engine 108 solicits from a user, through a simple dialog, all of the information needed to define the format of a component. The term format is used herein in a very broad sense to encompass the "look and feel" (e.g. the layout, color, font, etc.) as well as the functionality of the component. By collecting information in this way, the builder engine 108 in effect guides the user through the defining process. By doing so, the builder engine 108 makes it possible for a relatively unsophisticated user to define a component (i.e. to develop an application).

In one embodiment, the builder engine 108 takes the form of a generic engine which solicits information from a user based upon predefined metadata. More specifically, for each type of component that a user can define, there is an associated set of predefined metadata. This metadata specifies what information needs to be solicited from the user to define an instance of that type of component, and how that information should be solicited. Based upon this metadata, the generic builder engine 108 dynamically generates display pages to solicit the necessary information from the user. Implementing the builder engine 108 in this generic manner is quite advantageous because it makes it possible for a single engine to be used to guide a developer through the defining process for all possible types of components. To add a new type of component, all that needs to be done is to add a set of predefined metadata describing the new component type. The builder engine 108 will thereafter be able to guide a user through the defining process for that type of component. To change an existing component type, all that needs to be done is to change the predefined metadata associated with that component type. The builder engine 108 will thereafter reflect the change. No changes need to be made to the builder engine itself. Thus, the generic builder engine 108 is quite versatile and efficient.

Once the builder engine 108 solicits and receives all of the necessary information from the user to define a particular component, the information is stored as metadata associated with that particular component. This metadata differs from the predefined metadata used by the builder engine 108 in that the predefined metadata pertains to a type of component (e.g. report, form, etc.) whereas this metadata pertains to a particular instance of a type of component (e.g. "report 101", "form 203"). Once the metadata for a particular component has been defined, the component is ready to be rendered (i.e. executed).

At run time, one of the rendering engines 110 is invoked to dynamically generate the particular component. In one embodiment, a rendering engine 110 is provided for each type of component (e.g. a chart rendering engine, a form rendering engine, etc.), and each engine 110 is responsible for rendering all instances of that component type. In generating a particular component, a rendering engine 110 uses the metadata associated with that component. Each rendering engine 110 is constructed in such a way that it understands the metadata associated with a component, and contains logic for implementing the functionality specified by the metadata. In effect, the rendering engines 110 are responsible for implementing the format specified by the metadata.

An important point to note is that unlike the prior art methodologies, the present invention does not create a component (i.e. application) at design time and store it away as a static entity ready for execution. Rather, at design time, only the metadata needed to define a particular component instance is stored. At run time, this metadata is used by one of the rendering engines to dynamically generate the format of a component. Thus, according to the present invention, a component is both generated and executed at run time. Rendering components in this manner is advantageous in at least two respects. First, it eliminates the need to store components as individual static entities. This in turn significantly reduces storage requirements and simplifies the management and maintenance of the components. Second, the present invention significantly reduces code redundancy. In a system having a large number of applications, it is generally true that many of the applications contain identical code. Because the present invention uses the same generic rendering engine to render all components of a particular type, the code is centralized to the rendering engine. Due to this code centralization, there is practically no code redundancy. Overall, dynamically rendering components in accordance with the present invention leads to greater system efficiency.

In system 100, the general flow of operation is as follows. A user submits a request using the client 102. The request is sent to the server 106 via network 104. In response, the server 106 invokes one of the engines 108, 110 to perform the task or tasks requested, generates a response display page having a particular form understood by the client 102 (e.g. Hyper Text Markup Language (HTML)), and sends the response display page to the client 102 via network 104. In response, the client 102 renders the display page to the user, accepts any inputs provided by the user, and sends the inputs to the server 106. This process repeats until the user has completed interaction with the server 106. An important point to note regarding system 100 is that, because it is the server 106 that performs most if not all of the component logic processing, there is no need to install or to run any specialized component development/execution software on the client 102. All the client 102 needs to run is a program (such as a browser) that enables the client 102 to interact with the server. This aspect, combined with the fact that the network 104 can be the World Wide Web, means that a user can define and execute a component (i.e. develop and run an application) using practically any client 102 anywhere in the world. Hence, the present invention greatly increases the accessibility of database information to users.

Physical Embodiment

Figure 2:
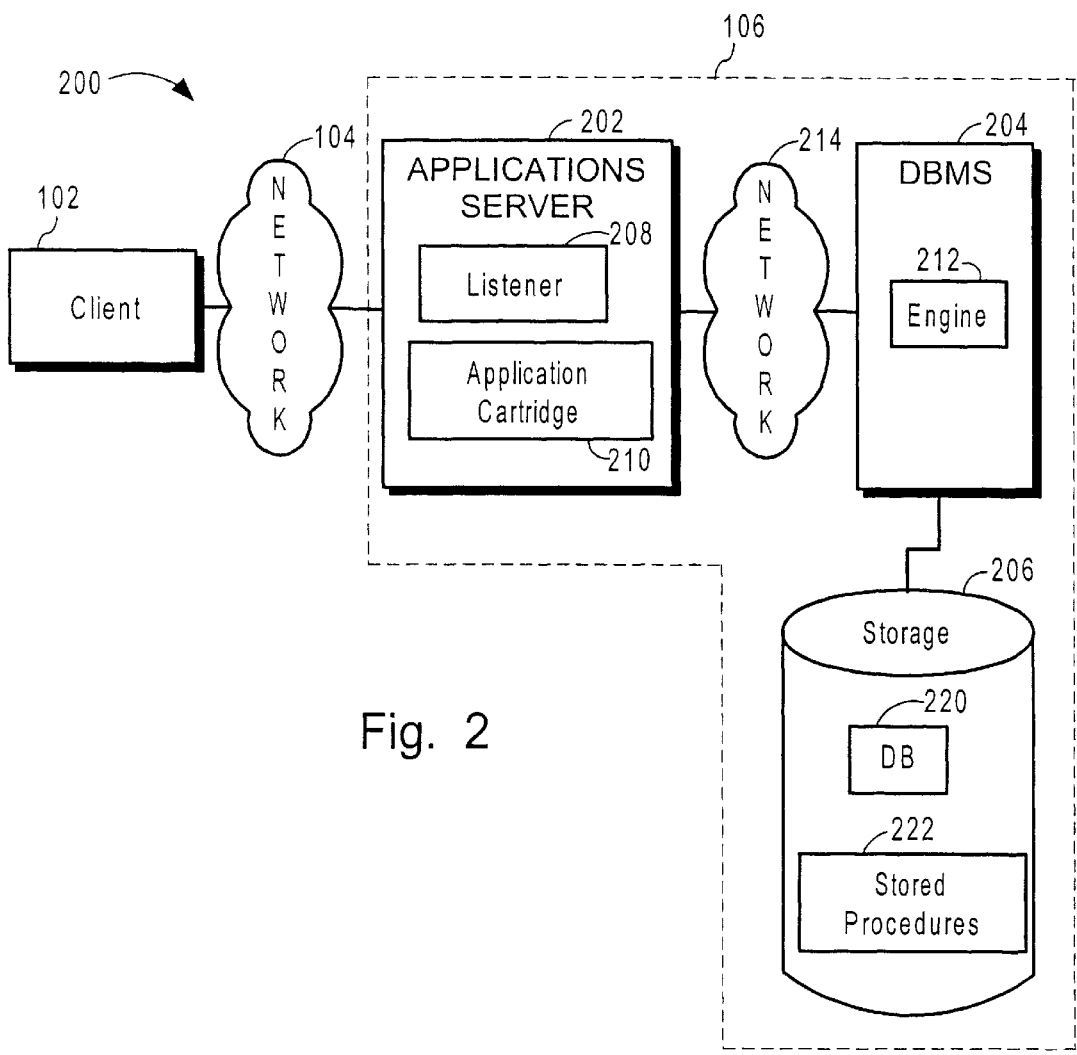
FIG. 2 is a block diagram of one possible physical embodiment of the present invention.

The above discussion provides an overview of the present invention. With reference to FIG. 2, one possible physical embodiment will now be described. FIG. 2 shows a more detailed depiction of the system of FIG. 1, wherein the server 106 has been broken out into two components: (1) an applications server 202; and (2) a database management system (DBMS) 204 for managing access to a database (DB) 220 stored in a storage 206. In system 200, the applications server 202 is primarily responsible for managing interaction between the client 102 and the DBMS 204, whereas the DBMS 204 is primarily responsible for implementing the core functionality of the present invention, as will be described. The applications server 202 is coupled to the DBMS 204 via a network 214, as shown. Like network 104, network 204 may be a LAN or a WAN. Alternatively, the applications server 202 may be coupled to the DBMS 204 via a direct connection.

The applications server 202 comprises a listener 208 and one or more application cartridges 210. The listener 208 is primarily responsible for receiving one or more requests from the client 102, and determining, based upon the request, what action needs to be performed. The proper action may comprise retrieving a particular HTML page, or invoking the functionality of an application cartridge 210. If the proper action is the latter, then the listener 208 forwards the request to the appropriate cartridge 210. In response, the application cartridge 210 processes the request, and performs whatever actions are necessary to respond to the request. One of these actions may be to generate a query to invoke a functionality of the DBMS 204. In one embodiment, the application server 202 takes the form of a Web Application Server, and the application cartridge 210 takes the form of a PL/SQL cartridge, both of which are manufactured by Oracle Corporation.

The DBMS 204, which may be any type of database management system including but not limited to a relational database management system, comprises a database engine 212. Engine 212 receives, parses, and executes queries to manipulate data in the database 220. Engine 212 also executes stored procedures 222 to impart certain specific functionality. In one embodiment, DBMS 204 takes the form of an Oracle 8 database management system, which is manufactured by Oracle Corporation.

Logical Components

Figures 3, 4A:
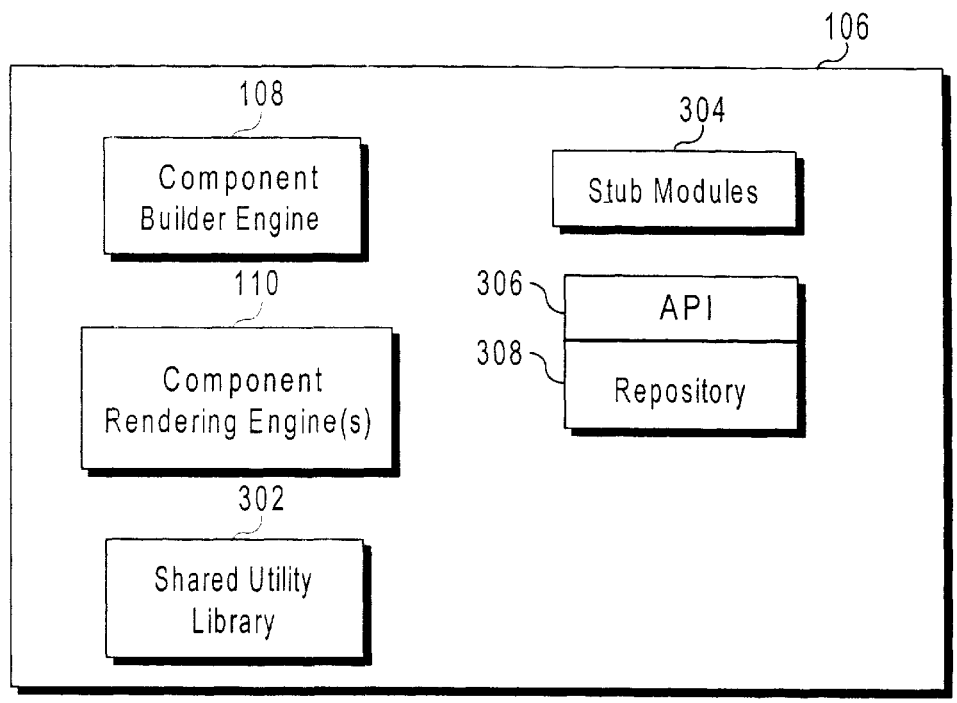
Figure 4C:
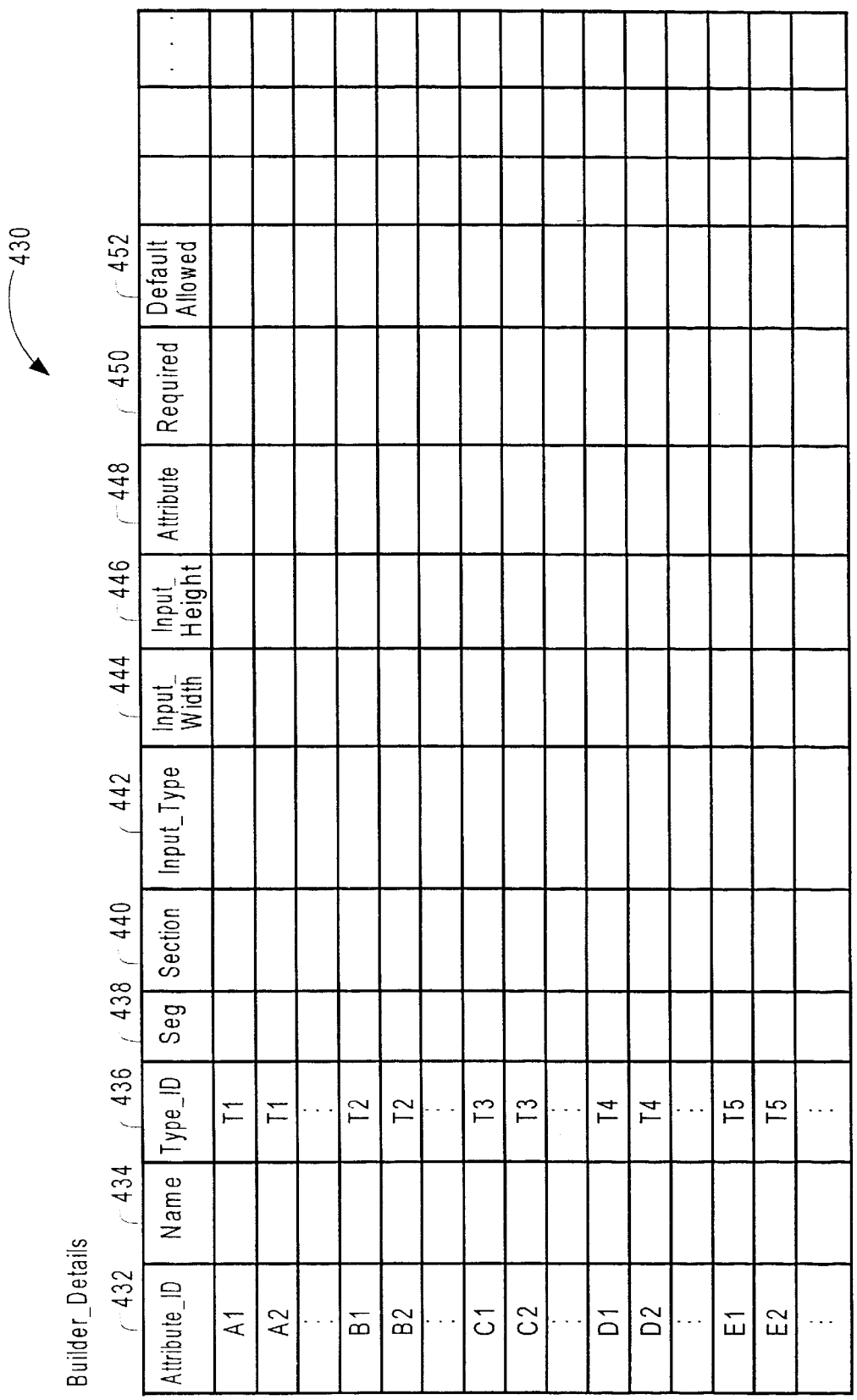

With reference to FIG. 3, there is shown a block diagram of the logical components of the server 106. The server 106 first comprises a component builder engine 108 for facilitating the development of specific instances of components. In one embodiment, the builder engine 108 is implemented as one or more stored procedures 222 (FIG. 2) stored within the storage 206. These stored procedures 222 are executed by the database engine 212 to give rise to the functionality of the builder engine 108. As noted previously, the builder engine 108 guides a user through the component definition process to enable a relatively unsophisticated user to develop a specific instance of a type of component (e.g. a specific report). In doing so, the builder engine 108 generates one or more display pages which are sent to the client 102 to solicit from the user the information needed to define the instance of the component. These display pages are generated by the builder engine 108 based upon predefined metadata, stored in the repository 308, which specify what information to solicit, and the manner in which such information is to be solicited. The repository 308 contains a set of predefined metadata for each type of component. Using these sets of predefined metadata, the same builder engine 108 can generate display pages to guide the user through the development process for any type of component.

In addition to generating display pages, the builder engine 108 also receives information from the user in response to the display pages. When such information is received, the builder engine 108 stores the information into the repository 308 as specific metadata associated with the component instance that the user is currently defining. This specific metadata will be used by one of the rendering engines 110 at a later time to render the specific component instance. As an option, the builder engine 108 may further generate a stub module 304 for the component instance that the user is defining. This stub module 304 is a very compact stored procedure 222 which may be invoked to conveniently render the specific instance. The basic function of a stub module 304, when executed by the database engine 204, is to gather all of the metadata specific to a particular component instance, and to invoke the proper rendering engine 110. For example, if the user is currently defining a specific report (e.g. "report 213"), then the stub module 304 for "report 213" would be a stored procedure for gathering all of the specific metadata associated with "report 213" and invoking the report rendering engine. Note that the stub module 304 only invokes the report rendering engine. It does not render the report itself. Hence, the stub module 304 is quite compact. The main advantage of using a stub module 304 is that it constitutes an entity in the context of the DBMS 204, and as an entity, it can be managed like any other entity. As a result, all of the security mechanisms of the DBMS 204 may be applied to the stub module 304. While the use of a stub module is advantageous, it should be noted that it is not necessary for the proper operation of the present invention. If so desired, a component instance may be rendered by directly invoking a rendering engine without the use of a stub module 304. This and other implementations are within the scope of the present invention.

The server 106 also comprises one or more component rendering engines 110 responsible for dynamically rendering components at run time. A rendering engine is provided for each type of component that the server 106 is capable of rendering, and each engine is responsible for rendering all component instances of that type. The component rendering engines 110 may include but are not limited to a report engine, a forms engine, a menu engine, a chart engine, a hierarchy engine, a dynamic pages engine, a header engine, and a footer engine. In one embodiment, each engine 110 is implemented as one or more stored procedures 222 stored within storage 206. These stored procedures 222 are executed by the database engine 204 to give rise to the functionality of the rendering engines 110. In rendering an instance of a component, a rendering engine 110 calls upon the metadata (stored within the repository 308) associated with that component instance. This metadata comprises the information supplied by the developer at the time that the instance was defined to specify the format of the component. Each rendering engine 110 comprises logic for understanding the metadata associated with a component instance of a certain component type, and for implementing the format specified by the metadata. Based upon this metadata, the format of the component instance is dynamically generated and executed at run time. In the course of generating and executing the format of a component instance, a rendering engine 110 dynamically generates one or more display pages. These display pages are generated in a form (such as HTML) understood by the client 102, and are sent to the client 102 for display to a user. The rendering of a component is thus manifested to the user.

One of the advantages of dynamically generating display pages in this manner is that it makes it possible to customize each display page for each user and each client. In a large system, different users may have different needs/ preferences. For example, a user in France may need the pages to be generated in French, whereas a user in England may need the pages to be generated in English. Also, different clients 102 may have different needs/limitations. For example, depending on the browser version that a client 102 is running, a client may or may not be able to support Javascript. If a client 102 is not able to support Javascript, then the pages need to be generated without Javascript. Because the rendering engines 110 of the present invention do not rely upon statically stored pages, but rather dynamically generate display pages at run time, they can accommodate such needs/limitations/preferences. More specifically, as a rendering engine 110 is generating a display page, it determines the needs, limitations, and preferences of the user and the client 102 making the rendering request (indications of these needs/limitations/preferences are sent as part of the request). It then generates the display pages in accordance with those needs/limitations/preferences. By doing so, the rendering engine 110 customizes each page for each specific user and each specific client 102.

In addition to the builder engine 108 and the rendering engines 110, server 106 further comprises a shared utility library 302. This library 302 comprises one or more utilities commonly invoked by the rendering engines 110 and the builder engine 108. These utilities include but are not limited to a translation utility, a Javascript validation utility, a list of values utility, and one or more UI templates. In one embodiment, these utilities are implemented as one or more stored procedures 222 stored in storage 206. These stored procedures 222 are executed by the database engine 212 to give rise to the functionality of the utilities. By providing the utilities in a shared library 302, the present invention further reduces code redundancy.

As noted previously, the repository 308 contains the metadata relied upon by the builder engine 108 and the rendering engines 110. With reference to FIGS. 4a–4d, the repository 308 will now be described in greater detail. The repository 308 comprises a plurality of metadata tables, including a Components Table 410, a Component_Definition Table 420, a Builder_Details Table 430, and a Component_Details Table 470. Tables 410, 420, and 430 comprise the predefined metadata used by the builder engine 108 to generate display pages for soliciting input from a user, while table 470 comprises the component specific metadata used by the rendering engines 110 to render specific component instances.

Referring first to the Components Table 410, this is the table in which all of the component types are set forth. Specifically, there is a row in Table 410 for each type of component. Table 410 comprises at least three columns: (1) a Type_ID column 412; (2) a Type_Name column 414; and a Type_Engine column 416. The Type_ID is the unique identifier associated with a particular type of component, the Type_Name is the name given to the component type, and the Type_Engine is the name of the rendering engine 110 responsible for rendering all component instances of that type. Thus, for example, as shown in FIG. 4a, there is a component type known as "Report". This component type has a unique type ID of "T1", and all instances of that component type are rendered by the "Report" rendering engine. For the sake of simplicity, FIG. 4a shows only five specific component types; however, it should be noted that more component types may be added if so desired.

The Component_Definition Table 420 is the table in which all of the attributes for all of the component types are set forth. Specifically, for each row in the Components Table 410 (i.e. for each component type), there is an associated set of rows in the Component_Definition Table 420, which specify all of the attributes associated with that type of component. By setting forth all of the attributes associated with each component type, table 420 in effect defines each component type. The Component_Definition Table 420 comprises at least three columns: (1) a Type_ID column 422; (2) an Attribute_ID column 424; and (3) a Default_Value column 426. The Type_ID is the unique identifier associated with a particular type of component, the Attribute_ID is the unique identifier associated with a particular attribute of a component type, and the Default_Value is the default value (if any) associated with a particular attribute. Notice that the Type_ID is common between the Components Table 410 and the Component_Definition Table 420. Hence, it acts as a link between the two tables.

The Builder_Details Table 430 provides more detailed information for the attributes in the Component Definition Table 420. Specifically, the Builder_Details Table 430 comprises a row for each of the attributes in the Component_Definition Table 420, and each row contains a variety of information pertaining to that particular attribute. The Builder_Details Table 430 comprises a plurality of columns, including an Attribute_ID column 432, a Name column, 434, and a Type_ID column 436. The Attribute_ID is the unique identifier associated with a particular attribute, the Name is the name given to the particular attribute, and the Type_ID is the unique identifier associated with a particular type of component. The Attribute_ID acts as a link between the Component_Definition Table 420 and the Builder_Details Table 430, and the Type_ID acts as a link between the Components Table 410 and the Builder_Details Table 430.

In addition to the above columns, the Builder_Details Table 430 further comprises the following columns.

(1) The Seq column 438 contains a sequence value associated with an attribute. This sequence number is used by the builder engine 108 to determine the order in which to solicit attribute values from a user.

(2) The Section column 440 contains a section number associated with an attribute. This section number is used by the builder engine 108 to group attributes into separate builder steps.

(3) The Input_Type column 442 specifies the user interface element associated with an attribute. The user interface element may be one of a variety different elements, including but not limited to a text field or text area, a poplist, a check box, a label, a button, a combo box, a title, and an image.

(4) The Input_Width column 444 specifies the width (in terms of characters) of the attribute. This parameter applies to sized fields.

(5) The Input_Height column 446 specifies the height (in terms of rows) of the attribute. This parameter applies to sized fields.

(6) The Attribute column 448 specifies a Yes or No value which determines whether the value for this attribute will be saved in the Component_Details Table 470.

(7) The Required column 450 specifies a Yes or No value which determines whether a value is required for an attribute.

(8) The Default_Allowed column 452 specifies a Yes or No value which determines whether a default value may be used for an attribute.

(9) The Builder_Details Table 430 may comprise other columns if so desired.

Overall, the Builder_Details Table 430 provides the builder engine 108 with all of the attribute-related information that it needs to determine how to solicit attribute information from a user. Given the information contained in tables 410, 420, and 430, the builder engine 108 can determine what information (i.e. which attribute values) needs to be solicited from a user to define an instance of a component type, and how that information should be solicited.

In response to the information solicitation, the builder engine 108 will receive from the user specific attribute values to be associated with a specific instance of a particular type of component (e.g. specific attribute values for "report 123"). When such information is received, it is stored into the Component_Details Table 470. The Component_Details Table 470 comprises a set of rows for each component instance, and each set of rows comprises a row for each attribute of the component instance. Together, all of the rows in a set of rows comprise the information needed to specify the format of the component instance. At run time, this instance-specific metadata is used by one of the rendering engines 110 to dynamically generate and execute the format of the component instance.

As shown in FIG. 4*d*, the Component_Details Table 470 comprises a plurality of columns, including an Instance_ID column 472, an Instance_Name column 474, a Version_No column 476, an Attribute_ID column 478, and an Attribute_Value column 480. The Instance_ID is the unique ID associated with a particular component instance, the Instance_Name is the name given to the instance, the Version_No specifies the version of a particular instance, the Attribute_ID is the unique ID associated with a particular attribute, and the Attribute_Value is the actual value of the attribute, which may be a default value or a value specified by the user. The Version_No makes it possible to have multiple versions of the same component instance. With multiple versions, it is possible to go from a current version of a component instance back to a previous version without having to redefine the instance. Given the information contained in table 470, the rendering engines 110 can dynamically render any component instance at run time.

To facilitate access to the tables in the repository 308, server 106 further comprises an application programming interface (API) 306. One of the main purposes of the API 306 is to shield the detail and complexity of the repository 308 from the engines 108, 110 so that the logic for the engines may be kept as general as possible. In doing so, the API 306 generates the necessary queries for accessing the tables in the repository 308. In one embodiment, the API 306 comprises three methods: (1) an INIT method; (2) a GET method; and (3) a SAVE method. The INIT method is invoked to load all of the records (rows) satisfying a certain specified criterion into memory for future access. For example, the invocation "INIT(123)" may be used to load all of the rows corresponding to Instance 123 (Table 470 of FIG. 4*d*) into memory. In effect, the INIT method is used to initialize a set of records. Once a set of records is loaded into memory, the GET method is invoked to access an individual row or record. The SAVE method is invoked to store information into one or more rows of the tables in the repository. For example, after the builder engine 108 receives a set of attribute values from a user, the engine 108 stores the values into the Component_Details Table 470. In performing this storing operation, the builder engine 108 invokes the SAVE method. For the sake of convenience, the builder engine 108 and rendering engines 110 will be described below as accessing the tables in the repository 308. However, it should be understood that the engines 108, 110 are accessing the tables using the API 306. At this point, it should be noted that while the API 306 advantageously facilitates access to the repository, it is not required for proper operation of the present invention. If so desired, the tables in the repository 308 may be accessed directly by the engines 108, 110 without the use of an API. This and other implementations are within the scope of the invention.

Operation of the Builder Engine

Figure 5:
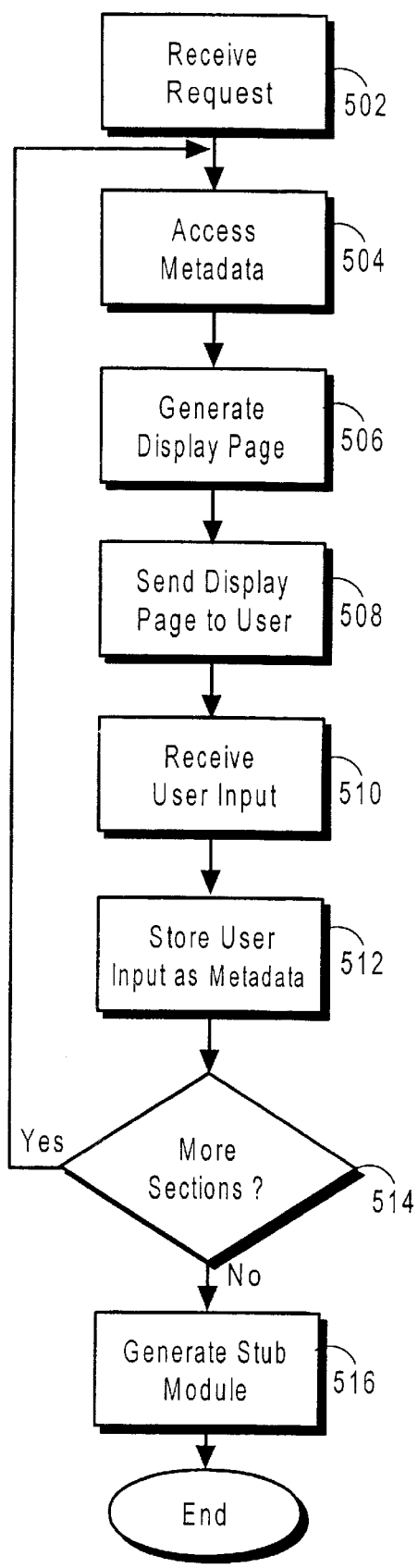
FIG. 5 is a flow diagram illustrating the operation of the builder engine of the present invention.

The logical and physical components of the present invention have been disclosed. With reference to the flow diagram of FIG. 5, the operation of the builder engine 108 will now be described. In the system shown in FIG. 2, the functionality of the builder engine 108 is invoked as follows. Using client 102, a user sends a request to the applications server 202 to define an instance of a particular type of component. This request specifies the type of component that the user wishes to define. Based upon information contained in the request, the listener 208 determines that the request should be processed by the application cartridge 210, and forwards the request to the cartridge 210. In response, the cartridge 210 generates and sends a query to the DBMS 204 to cause the engine 212 to execute the one or more stored procedures 222 constituting the builder engine 108. The functionality of the builder engine 108 is thus invoked.

Once invoked, the builder engine 108 begins operation by receiving (502) the request, which specifies the type of component that the user wishes to define. For the sake of illustration, it will be assumed that the user is requesting to define a new instance of a report; however, it should be noted that the builder engine 502 may be invoked to define any type of component. From the Components Table 410, it is determined that a report has a Type_ID of T1. Armed with the Type_ID (T1) of the component, the builder engine 108 consults (504) the Component_Definition Table 420 to retrieve therefrom a list of the attribute ID's (A1, A2, A3 . . . ) associated with the Type_ID of T1. In effect, the builder engine 108 is compiling a list of all of the attributes that need to be specified in order to define an instance of a report. Using the attribute ID's obtained from the Component_Definition Table 420, the builder engine 108 consults the Builder_Details Table 430 and obtains therefrom all of the detailed information for each of the attributes (A1, A2, A3 . . . , referred to below as the report attributes) associated with a report. At this point, the builder engine 108 has all of the information that it needs to solicit input from a user. Namely, from table 420, the builder engine 108 knows which attributes need to be specified by the user, and from table 430, the builder engine 108 knows how each attribute should be solicited. Builder engine 108 is now ready to solicit input from the user.

The builder engine 108 begins the solicitation process by generating (506) a first display page. According to one embodiment, the builder engine 108 achieves this by looking in the Section column 440 (Table 430) of each of the report attributes (A1, A2, A3 . . . ) for a particular starting value (e.g. 1). As noted previously, the value in the Section column 440 is used to group certain attributes together. Thus, all report attributes having the starting value in the Section column 440 belong on the first display page. Once all of the attributes belonging on the first display page are determined, they are ordered in accordance with the values stored in the Seq column 438. Basically, the Seq column 438 specifies how the attributes within a certain section should be ordered. Once the order of the first page attributes is determined, the builder engine 108 proceeds to generate display information for each of the first page attributes. The format and the content of the display information for each attribute depends upon the properties of the attribute, such as the Input_Type 442, the Input_Width 444, and the Input_Height 446. The builder engine 108 takes all of the attribute properties into account in generating the display information. To facilitate rendering by the client 102, the builder engine 108 generates the display information in a form (such as HTML) understood by the client 102. Once the builder engine 108 has generated the display information for all of the first page attributes, it sends (508) the first display page to the application server 202, which in turn sends the display page to the client 102. The builder engine 108 then waits for a response.

Upon receiving the display page, the client 102 renders the page to the user. Based upon the information on the page, the user is prompted to provide certain attribute values needed to define the component instance that the user wishes to define. By prompting the user in this manner, the builder engine 108 is in effect guiding the user through the defining process. In response to the first display page, the user may choose to provide some or all of the requested information for the first page attributes. This user input is entered into the client 102, and is, at some point, sent by the client 102 to the applications server 202, and on to the builder engine 108 executing in the DBMS 204.

Upon receiving (510) the user input, the builder engine 108 selectively stores (512) the attribute values provided by the user into the Component_Details Table 470 as metadata. In carrying out (512), the builder engine 108 first assigns a unique Instance_ID to the component instance that the user is defining. The builder engine 108 then stores a row into the Component_Details Table 470 for each of the first page attributes. In each row (i.e. for each first page attribute), there is stored the newly assigned unique ID in the Instance_ID column 472. There is also stored a name associated with the instance in the Instance_Name column 474 (the instance name is provided by the user as part of the user input). Further, a version number and the ID of the attribute are stored into columns 476 and 478, respectively.

Then, the builder engine 108 determines what value, if any, is to be stored into the Attribute_Value column 480 for a particular attribute. In making this determination, the builder engine 108 looks at the value in the Attribute column 448 (table 430) for the attribute. If the value in this column 448 indicates that the attribute is not a savable attribute, then no value is stored in the Attribute_Value column (table 480). On the other hand, if the attribute is a savable attribute, then the builder engine 108 looks at the user input and the other properties of the attribute, such as the Required column 450 and the Default_Allowed column 452. More specifically, if the user has specified a value for the attribute, then that value is stored into the Attribute_Value column 480. If the user has not specified a value, and the value in the Required column 450 indicates that a value is not required, then no value is stored in column 480. If the user has not specified a value, and the value in the Required column 450 indicates that a value is required, and the value in the Default_Allowed column 452 indicates that a default value is allowed, then the value in the Default_Value column 420 of Table 420 for the attribute is stored into column 480. If the user has not specified a value, and the value in the Required column 450 indicates that a value is required, and the value in the Default_Allowed column 452 indicates that a default value is not allowed, then the user will need to be prompted again to specify a value for the attribute. Once a value is received from the user, the value is stored into column 480. In the manner described, the Component_Details Table 470 is populated with rows corresponding to the first page attributes of the specific report instance.

Once the first page attributes have been specified, the builder engine 108 proceeds to determine (514) whether more display pages need to be generated. Builder engine 108 makes this determination by checking the Section column 440 of the report attributes for a next value (e.g. 2). If any of the report attributes have a next value in the Section column 440, then the builder engine 108 loops back to (504) to access more metadata, generate and send another display page, and receive and store another set of user input into the Component_Details Table 470. This process continues until there are no more new values in the Section column 440 of the report attributes. By the end of this process, a complete set of rows will have been written into the Component_Details Table 440. These rows fully define the format of the report instance. The report instance is now ready for generation and execution by the report rendering engine.

To facilitate component management within the DBMS 204, the builder engine 108 may further generate (516) a stub module for this new component instance. As noted previously, this stub module is not required for the proper operation of the invention, but it does facilitate the execution and management of the component. In generating the stub module, the builder engine 108 creates a new stored procedure having a structure such as that shown below:

```
INIT (Instance_D)
Render_Report
   Get A1
   Get A2
   Get A3
      .
      .
```

The INIT statement is an invocation of the INIT method of the repository API 306 (FIG. 3), which causes all of the metadata in the Component_Details Table 470 associated with a particular Instance_ID to be loaded into memory. In this case, the builder engine 108 inserts as the Instance_ID the unique ID assigned to the report instance that was just defined. Thus, when executed, this INIT statement will cause all of the specific metadata associated with the newly defined report instance to be loaded into memory.

The Render statement causes the proper rendering engine to be invoked to render the component instance. In this case, the proper rendering engine is the Report engine. The builder engine 108 knows this because the Type_Engine column of the Components Table 410 specified the name of the engine for this type of component. As part of the invocation, attribute values are provided to the engine. To keep the stub module as general as possible, the builder engine 108 does not hard code any specific attribute values into the invocation. Rather, it passes attribute values to the rendering engine through a series of GET method invocations. The GET method is a method of the repository API 306 which retrieves a set of information that has already been loaded into memory. By invoking a series of GET's on the report attributes (A1, A2, A3 . . . ), the builder engine 108 causes the specific attribute values for the specific report instance to be passed in to the report rendering engine. Armed with this information, the rendering engine will be able to dynamically generate and execute the format of the report instance. In addition to the invocations discussed, the builder engine 108 may include other method/functionality invocations in the stub module, such as invocation of the header and footer rendering engines. These and other invocations may be included in the stub module if so desired. After creating the stub module, the defining task of the builder engine 108 is completed. The report instance is now ready to be rendered.

Operation of the Rendering Engines

In system 200, to render a component instance, the client 102 sends a rendering request to the applications server 202a via network 104. This request specifies the specific component instance to be rendered. It may also specify a set of user preferences (e.g. a language preference, etc.) associated with the user making the request, and a set of client specifications (e.g. Javascript enabled or not, browser type, browser version, etc.) associated with the client sending the request. As will be explained further below, this information makes it possible to customize the component instance for the user and the client. Upon receiving the rendering request, the listener 208 of the applications server 202 determines that the request should be handled by the application cartridge 210, and hence, forwards the request to the cartridge 210. The cartridge 210, in response, determines that the request is a request to render a specific component instance, and generates a query for causing the engine 212 of the DBMS 204 to execute the stub module 304 associated with the component instance. When this query is sent to and executed by the DBMS 204, it causes the engine 212 to execute the stub module 304 associated with the component instance. By way of the INIT method in the stub module 304, all of the metadata from the Component_Details Table 470 that is associated with the specific instance is loaded into memory. By way of the Render invocation in the stub module 304, the engine 212 is caused to begin executing the one or more stored procedures constituting the rendering engine 110 specified in the stub module 304. The appropriate rendering engine is thus invoked.

Figure 6:
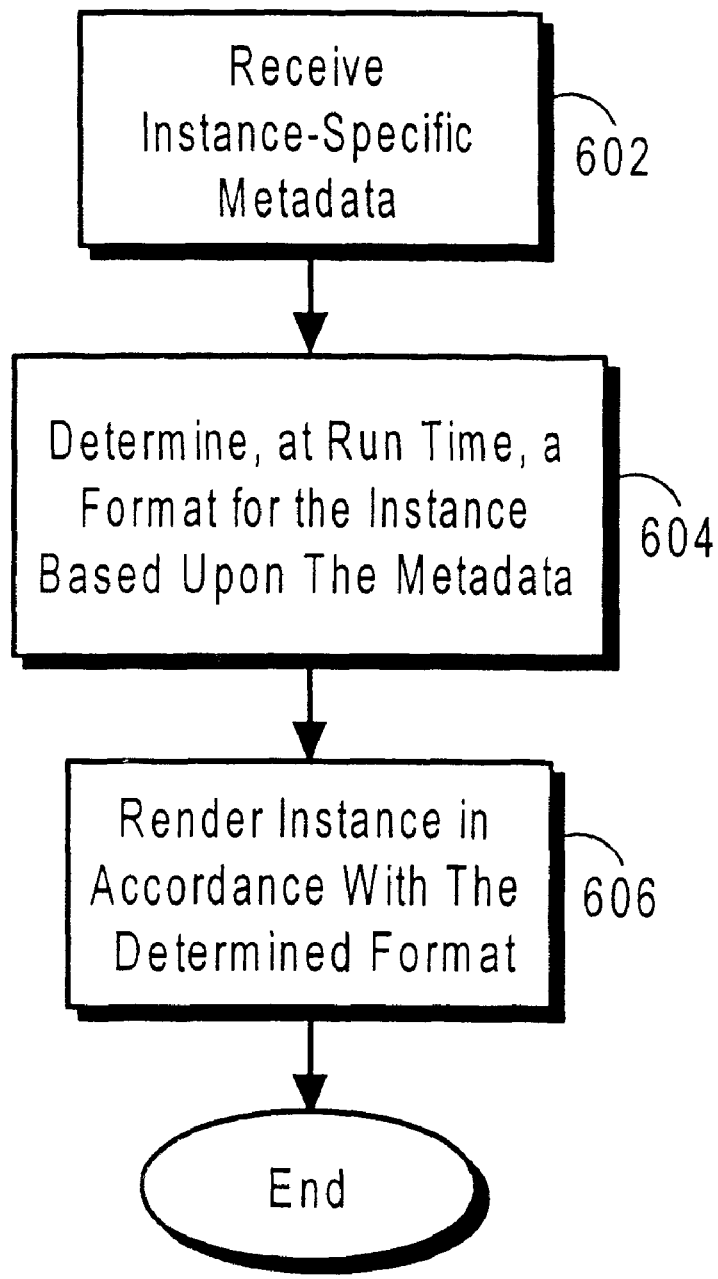
FIG. 6 is a flow diagram illustrating the operation of a rendering engine of the sent invention.

With reference to the flow diagram of FIG. 6, the general operation of a rendering engine 110 will now be described. Because the operation of each rendering engine 110 is implementation specific and will vary greatly from implementation to implementation, specific operational details will not be discussed. Once a rendering engine 110 is invoked, it receives (602), through a series of GET statements, all of the metadata from the Component_Details Table 470 that is associated with a specific component instance. This information provides the rendering engine 110 with all of the attribute values that it needs to render the instance. The rendering engine 110 comprises sufficient logic for understanding the metadata associated with a component instance, and contains logic for implementing the functionality specified by the metadata. Based upon this metadata, the rendering engine 110 dynamically determines (604), at run time, a format for the component instance. As an example, a report instance may have an attribute value that represents the number of columns to present on a report, and another attribute value that represents the number of rows to present on the report. The report rendering engine 110 has sufficient logic to understand what these values represent, and logic to implement the format specified by these attribute values. In this manner, the rendering engine 110 determines the format of the component instance dynamically at run time.

At this point, it should be noted that this approach of determining a format dynamically at run time differs significantly from that of the prior art. With the prior art, the format of a component is completely defined, determined, and constructed at design time. All that is done at run time is to render the format that was created at design time. This is true under either the programming methodology or the development tool methodology. Because of this approach, the prior art is forced to create and maintain static entities that contain the pre-constructed formats of the components. The methodology of the present invention is quite different. Rather than constructing a format at design time, the present invention just defines the format of a component instance at design time. This definition, as described previously, takes the form of metadata that can be compactly stored in, for example, a table. No format is determined or constructed. It is not until run time that the format of a component is dynamically determined and generated. By rendering components in this manner, the present invention obviates the need to create and maintain pre-constructed static component entities.

Figure 7:
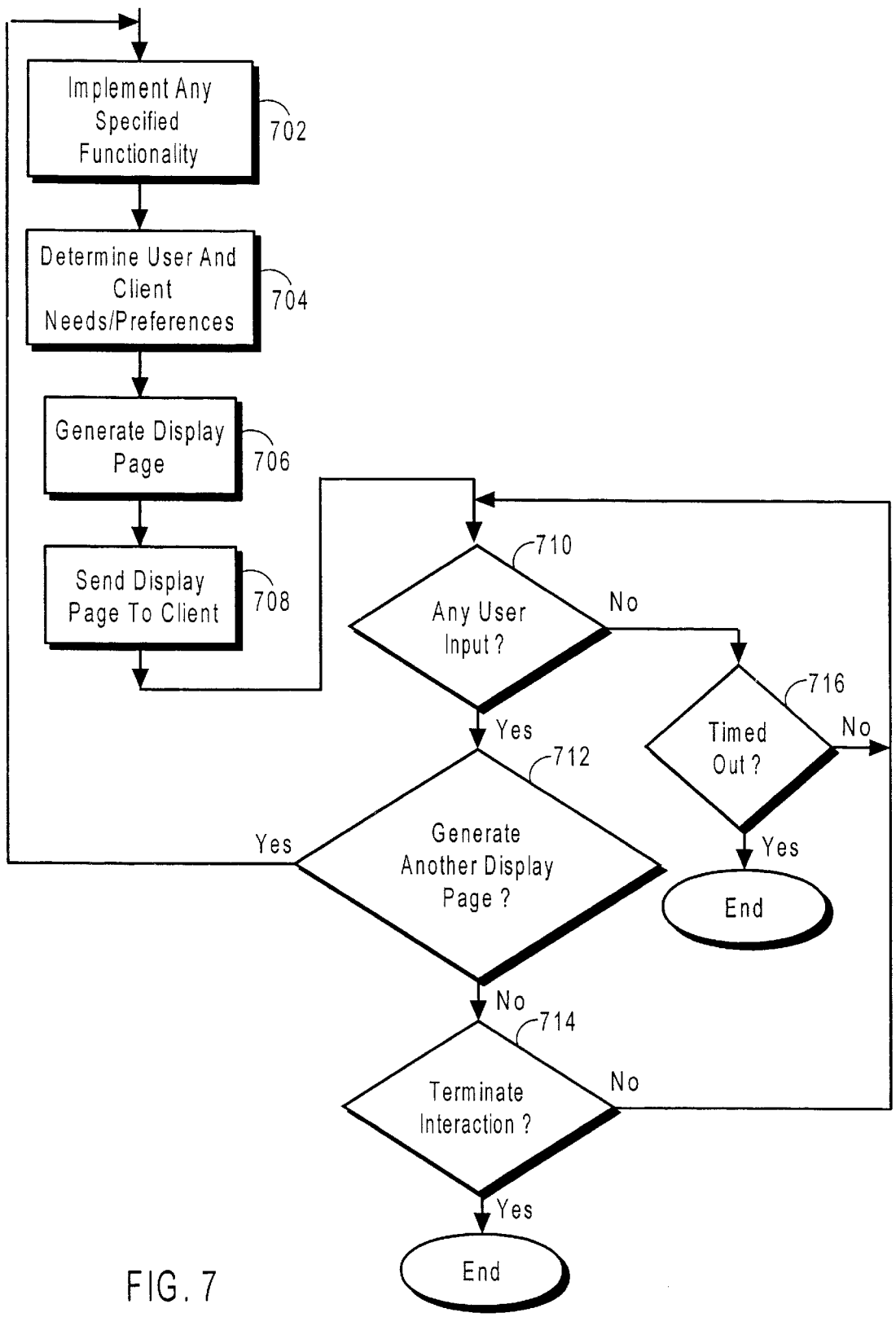
FIG. 7 is a flow diagram illustrating, in greater detail, the rendering operation own in FIG. 6.

Once a format for the component instance is determined, the rendering engine 110 proceeds to render (606) the instance in accordance with the determined format. The process of rendering (606) an instance is shown in greater detail in FIG. 7, wherein the rendering engine begins by implementing (702) any functionality specified by the metadata. This may include, for example, executing a query to retrieve certain data from the database 220. The rendering engine 110 then determines (704) what user preferences and client specifications (if any) were sent along with the rendering request. This information enables the rendering engine 110 to determine how to customize the component instance for the user and the client 102. Thereafter, the rendering engine 110 proceeds to generate (706) a display page. This display page is generated in accordance with the dynamically determined format, the user preferences, and the client specifications, and may contain information retrieved from the database 220. Thus, if the metadata indicates that a report should have five columns and thirty rows, then the engine 110 will generate a report page having five columns and thirty rows. Likewise, if the user preference indicates that the page should be presented in English, then the page will be generated in English. Further, if the client specification indicates that the client is running a certain browser version, then the page may be generated to specifically accommodate that browser version. In this manner, the rendering engine 110 dynamically generates a page which is customized for the user and the client 102, and which has the proper dynamically determined format. In one embodiment, the display page is generated in a form (such as HTML) which is suitable for rendering by a standard browser.

Once the display page is generated, it is sent (708) back to the client 102 via the applications server 202 and the network 104. Thereafter, the rendering engine 110 monitors (710) for user input. If no user input is received, then the engine 110 determines (716) whether the component has timed out. If so, the rendering engine 110 terminates the rendering of the component instance. On the other hand, if the instance has not timed out, then the engine 110 loops back to (710) to monitor for user input. If user input is detected, the rendering engine 110 processes the input and determines (712) whether it is necessary to generate another display page. If so, then the engine 110 loops back to (702) to repeat the process described above. If it is not necessary to generate another display page, the rendering engine 110 proceeds to determine (714) whether to terminate interaction. If so, the engine 110 terminates rendering of the instance. Otherwise, the engine 110 loops back to (710) to monitor for user input. In the manner described, the rendering engine 110 dynamically renders a component instance.

Hardware Overview

Figure 8:
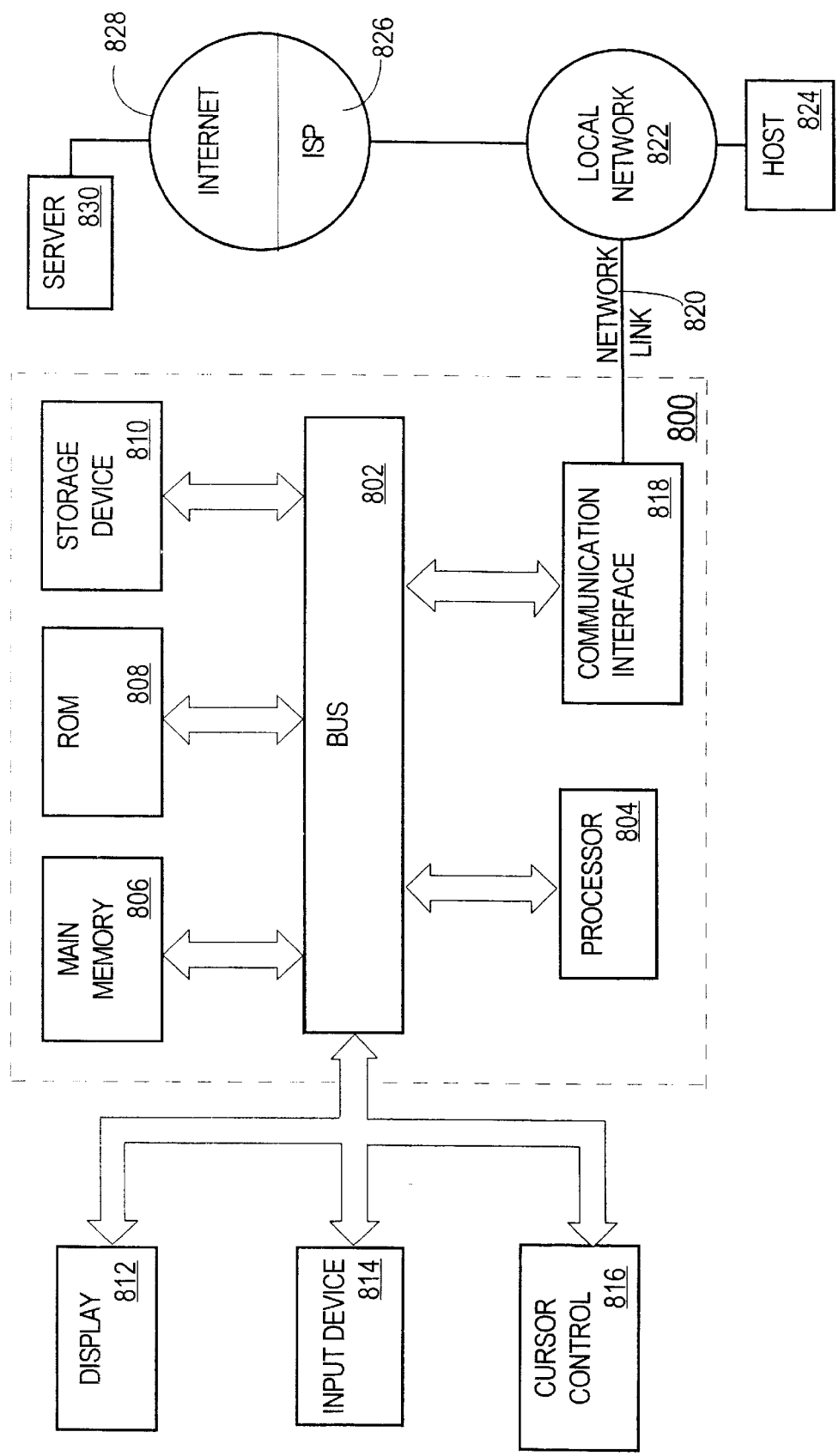
FIG. 8 is a block diagram of a general computer system which may be used to implement various components of the present invention.

FIG. 8 shows a block diagram of a general computer system 800 which may be used to implement various hardware components of the present invention, such as the client 102, the applications server 202, and the DBMS 204. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

According to an embodiment, the functionality of the present invention is provided by computer system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or electromagnetic waves, such as those generated during radio-wave, infra-red, and optical data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 104.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 120 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. The received code may be executed by processor 804 as it is received, and/or stored in storage device 810, or other non-volatile storage for later execution. In this manner, computer system 800 may obtain application code in the form of a carrier wave.

At this point, it should be noted that although the invention has been described with reference to a specific embodiment, it should not be construed to be so limited. Various modifications can be made by those of ordinary skill in the art with the benefit of this disclosure without departing from the spirit of the invention. Thus, the invention should not be limited by the specific embodiments used to illustrate it but only by the scope of the appended claims.

What is claimed is:

1. A computer implemented method for dynamically rendering a component at run time, comprising:

receiving a rendering request, said rendering request comprising an indication of a particular component instance to be rendered;

accessing, based upon said indication of said particular component instance, a set of metadata associated with said particular component instance, said metadata comprising information which may be used to determine a format for said particular component instance but which does not specify a predetermined layout for said particular component instance;

dynamically determining, at run time, a format for said particular component instance based upon said metadata, said format comprising a dynamically determined layout; and dynamically rendering said particular component instance at run time in accordance with said format.

2. The method of claim 1, wherein said metadata is stored in one or more rows of one or more tables.

3. The method of claim 1, wherein said metadata is stored in one or more rows of one or more relational database tables.

4. The method of claim 1, wherein rendering comprises:

generating at run time one or more display pages in accordance with said format, said one or more display pages being generated in a form understood by a client running a browser; and sending said one or more display pages to the client for display to a user.

5. The method of claim 4, wherein said one or more display pages are generated in Hypertext Markup Language (HTML).

6. The method of claim 4, wherein rendering further comprises:

implementing functionality specified by said metadata.

7. The method of claim 1, wherein rendering comprises:

determining a set of user preferences associated with a user submitting said rendering request; and rendering said particular component instance in accordance with said format and said user preferences such that said particular component instance is customized for the user.

8. The method of claim 1, wherein rendering comprises:

determining a set of client preferences associated with a client used to submit said rendering request; and rendering said particular component instance in accordance with said format and said client preferences such that said particular component instance is customized for the client.

9. The method of claim 1, wherein said particular component instance is of a particular type, and wherein determining and rendering are carried out by a generic rendering engine which is responsible for rendering all instances of said particular type of component.

10. The method of claim 9, wherein said generic rendering engine comprises one or more stored procedure in a database management system.

11. The method of claim 1, wherein the following are performed prior to receiving said rendering request:

receiving a request from a user to define said particular component instance;

prompting the user for input to specify said metadata;

receiving said metadata from the user; and storing said metadata in association with said particular component instance, thereby enabling the user to define said particular component instance without writing any computer program instructions.

12. The method of claim 11, wherein receiving a request from a user, prompting the user, receiving said set of metadata, and storing said set of metadata are carried out by a generic builder engine.

13. The method of claim 12, wherein said generic builder engine comprises one or more stored procedures in a database management system.

14. An apparatus for dynamically rendering a component at run time, comprising:

a mechanism for receiving a rendering request, said rendering request comprising an indication of a particular component instance to be rendered;

a mechanism for accessing, based upon said indication of said particular component instance, a set of metadata associated with said particular component instance, said metadata comprising information which may be used to determine a format for said particular component instance but which does not specify a predetermined layout for said particular component instance;

a mechanism for dynamically determining, at run time, a format for said particular component instance based upon said metadata, said format comprising a dynamically determined layout; and a mechanism for dynamically rendering said particular component instance at run time in accordance with said format.

15. The apparatus of claim 14, further comprising a storage, and wherein said metadata is stored in one or more rows of one or more tables in said storage.

16. The apparatus of claim 14, further comprising a storage, and wherein said metadata is stored in one or more rows of one or more relational database tables in said storage.

17. The apparatus of claim 14, wherein the mechanism for rendering comprises:

a mechanism for generating at run time one or more display pages in accordance with said format, said one or more display pages being generated in a form understood by a client running a browser; and a mechanism for sending said one or more display pages to the client for display to a user.

18. The apparatus of claim 17, wherein said one or more display pages are generated in Hypertext Markup Language (HTML).

19. The apparatus of claim 14, wherein the mechanism for rendering comprises:

a mechanism for determining a set of user preferences associated with a user submitting said rendering request; and a mechanism for rendering said particular component instance in accordance with said format and said user preferences such that said particular component instance is customized for the user.

20. The apparatus of claim 14, wherein the mechanism for rendering comprises:

a mechanism for determining a set of client preferences associated with a client used to submit said rendering request; and a mechanism for rendering said particular component instance in accordance with said format and said client preferences such that said particular component instance is customized for the client.

21. The apparatus of claim 14, further comprising:

a mechanism for receiving a request from a user to define said particular component instance;

a mechanism for prompting the user for input to specify said metadata;

a mechanism for receiving said metadata from the user; and a mechanism for storing said metadata in association with said particular component instance, thereby enabling the user to define said particular component instance without writing any computer program instructions.

22. A computer readable medium having stored thereon a set of instructions, which when executed by one or more processors, causes the one or more processors to dynamically generate a component, said computer readable medium comprising:

instructions for causing one or more processors to receive a rendering request, said rendering request comprising an indication of a particular component instance to be rendered;

instructions for causing one or more processors to access, based upon said indication of said particular component instance, a set of metadata associated with said particular component instance, said metadata comprising information which may be used to determine a format for said particular component instance but which does not specify a predetermined layout for said particular component instance;

instructions for causing one or more processors to dynamically determine, at run time, a format for said particular component instance based upon said metadata, said format comprising a dynamically determined layout; and instructions for causing one or more processors to dynamically render said particular component instance at run time in accordance with said format.

23. The computer readable medium of claim 22, wherein said metadata is stored in one or more rows of one or more tables.

24. The computer readable medium of claim 22, wherein said metadata is stored in one or more rows of one or more relational database tables.

25. The computer readable medium of claim 22, wherein the instructions for causing one or more processors to render comprises:

instructions for causing one or more processors to generate at run time one or more display pages in accordance with said format, said one or more display pages being generated in a form understood by a client running a browser; and instructions for causing one or more processors to send said one or more display pages to the client for display to a user.

26. The computer readable medium of claim 25, wherein said one or more display pages are generated in Hypertext Markup Language (HTML).

27. The computer readable medium of claim 22, wherein said instructions for causing one or more processors to render comprises:

instructions for causing one or more processors to determine a set of user preferences associated with a user submitting said rendering request; and instructions for causing one or more processors to render said particular component instance in accordance with said format and said user preferences such that said particular component instance is customized for the user.

28. The computer readable medium of claim 22, wherein said instructions for causing one or more processors to render comprises:

instructions for causing one or more processors to determine a set of client preferences associated with a client used to submit said rendering request; and instructions for causing one or more processors to render said particular component instance in accordance with said format and said client preferences such that said particular component instance is customized for the client.

29. The computer readable medium of claim 22, further comprising:

instructions for causing one or more processors to receive a request from a user to define said particular component instance;

instructions for causing one or more processors to prompt the user for input to specify said metadata;

instructions for causing one or more processors to receive said metadata from the user; and instructions for causing one or more processors to store said metadata in association with said particular component instance, thereby enabling the user to define said particular component instance without writing any computer program instructions.

* * * * *